Aug. 17, 1943.   G. W. CARLSON   2,327,172
PNEUMATIC ACTUATING MECHANISM FOR ELECTRICALLY OPERATED TYPEWRITERS
Filed Jan. 11, 1940   6 Sheets-Sheet 1

Fig.1.

INVENTOR
George W. Carlson
by his attorneys
Stebbins, Blenko & Parmelee

Aug. 17, 1943. G. W. CARLSON 2,327,172
PNEUMATIC ACTUATING MECHANISM FOR ELECTRICALLY OPERATED TYPEWRITERS
Filed Jan. 11, 1940 6 Sheets-Sheet 5

INVENTOR
George W. Carlson
by his attorneys

Aug. 17, 1943.  G. W. CARLSON  2,327,172
PNEUMATIC ACTUATING MECHANISM FOR ELECTRICALLY OPERATED TYPEWRITERS
Filed Jan. 11, 1940  6 Sheets-Sheet 6

INVENTOR
George W. Carlson
by his attorneys

Patented Aug. 17, 1943

2,327,172

UNITED STATES PATENT OFFICE 2,327,172

PNEUMATIC ACTUATING MECHANISM FOR ELECTRICALLY OPERATED TYPEWRITERS

George W. Carlson, Pittsburgh, Pa., assignor to Robert H. McClintic, Pittsburgh, Pa.

Application January 11, 1940, Serial No. 313,415

12 Claims. (Cl. 197—20)

This invention relates to a pneumatic record controlled action specifically designed for use with electrically operated typewriters of the character wherein the typewriter is provided with a power mechanism for actuating the type bars, the typewriter keys merely serving to establish a driving relation between the power mechanism and the type bars.

Electrically operated typewriters of the class above referred to usually have a power mechanism including a friction roller which is continuously driven, and the connections for operating the type bars include friction shoes while the typewriter keys serve to bring the friction shoes into engagement with the surface of the roller to actuate the type bars. Such typewriters require only a very light touch or pressure to depress the keys. Such typewriters are also provided with a power driven carriage return mechanism that is also actuated by a key located on the keyboard of the typewriter.

The present invention provides a record controlled pneumatic actuating mechanism to which such an automatic typewriter can be attached or from which it may be removed in a very simple manner and without requiring the services of any mechanic and by means of which any electrically operated typewriter may be immediately converted into an automatic record operated typewriter for the individual typing of form letters and similar operations. The invention further provides a pneumatic mechanism of this character which is very small and compact and which, even when attached to the typewriter, does not interfere with the usual manual operation of the typewriter. The invention provides a mechanism of a character which does not require any special cabinet or housing but which can be placed on any typewriting table without materially increasing the height of the typewriter above the floor. It provides a mechanism of this character which is simple to manufacture and which can be made to sell very much cheaper than pneumatic actions for typewriters as they have been heretofore constructed.

Heretofore automatic typewriters using a pneumatic action for operating the keys have been of two types. The first is merely an adaptation of the conventional player piano action to the operation of typewriter keys and in such mechanisms the pneumatic action includes a tracker bar and a record driving mechanism. The tracker bar in conjunction with the record governs the operation of a pneumatic system which includes a vacuum pump of large capacity. The admission of air to the tracker bar controls the operation of pneumatic valves which are connected with the suction pump and these pneumatic valves in turn control the operation of small bellows-like power units which are known in the art as "pneumatics." These pneumatics are connected through tension rods with the typewriter keys. The typewriter is of the conventional type wherein the pressure for operating the type bars is transmitted through the keys. Each pneumatic is a separate power unit and an individual adjustment has to be made in the tension rod between each pneumatic and the key which it operates. The attaching of the typewriter to such a mechanism has to be done in a factory where skilled mechanics are available for properly tensioning all of the operating rods so that the typewriter keys will be operated with as nearly a uniform pressure as possible. The second type of pneumatic mechanism which has heretofore been quite generally used employs the tracker bar and record spool mechanism. A vacuum pump of smaller capacity is employed, and the tracker bar controls the operation of a selector. The selector comprises a number of pneumatic pouches each of which has a finger. The admission of air to the tracker bar opening relieves the suction behind the pouch and causes the pouch to be flexed by atmospheric pressure in one direction, and when the tracker bar opening has closed, the suction pump is again effective to flex the pouch in the other direction. Each selector finger is connected with an element depending from a typewriter key. There is a single power device, known in the art as a "rocker bar" which moves up and down in timed relation to the operation of the record, and the movement of the selector is utilized to connect any one key with the rocker bar. The rocker bar is in some cases mechanically operated from the driving motor and in some cases it is pneumatically operated by air impulses entering through the tracker bar. This mechanism has certain advantages over the type first described in that the use of pneumatics and the use of the pneumatic valves is eliminated, and since all of the keys are operated from the same rocker bar, the connecting of the typewriter to the pneumatic mechanism can be accomplished in the field, but the operating connections are such as to require the services of a skilled mechanic.

The present invention provides a unit in which the valves and pneumatics of the first mechanism described are eliminated and a mechanism wherein the rocker bar and the selector connections of the second type of mechanism are eliminated, but wherein a selector unit similar to that used in the second type of mechanism is used as a primary mover for actuating the typewriter keys. This is made possible by reason of the fact that the keys may be depressed with a very slight pressure. According to the present invention there is also provided a mechanism wherein the power from the selector is transmitted to the keys through a series of equally spaced hooks each of which is connected to a selector finger, and to connect the typewriter to the pneumatic mechanism it is merely necessary to set the typewriter in position over the pneumatic mechanism so that the hooks extend up between the key bars and then shift the typewriter laterally whereupon the hooks at the upper end of the key bars extend over the key bars whereupon any downward pull on these hooks is transmitted to the key bars but wherein the key bar can move down from under the hook without operating the hook so that the hook does not interfere in any way with the manual operation of the typewriter. The typewriter may be removed by first shifting it sideways in a reverse direction and then lifting it up. These operations can be performed by anyone without the use of tools and without special training.

My invention may be readily understood by reference to the accompanying drawings in which.

Figure 2:
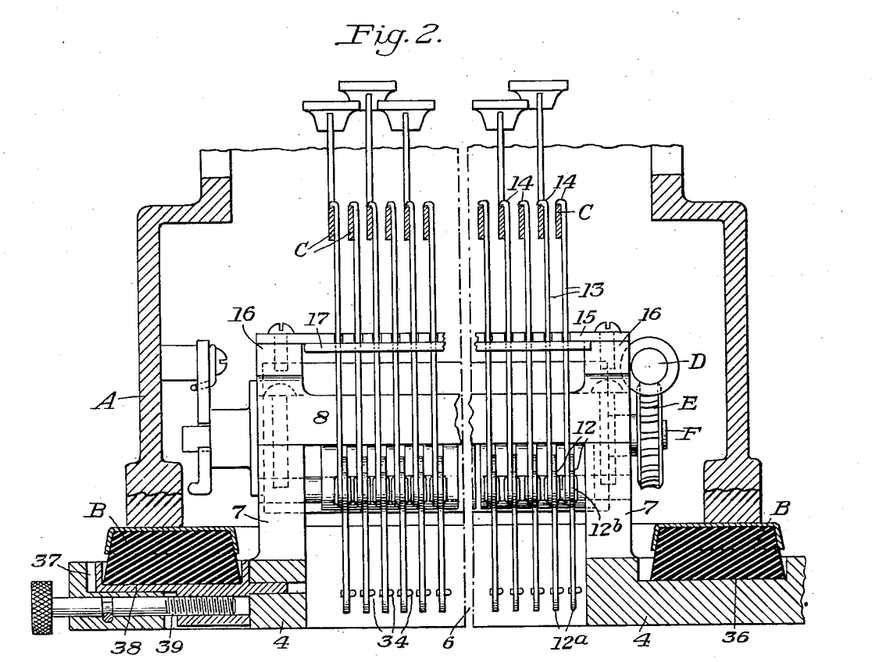
Figure 2 is a transverse section through the apparatus shown in Figure 1 in substantially the plane of line II—II of Figure 1 but showing certain parts of a typewriter in combination with the mechanism.
Figure 5:
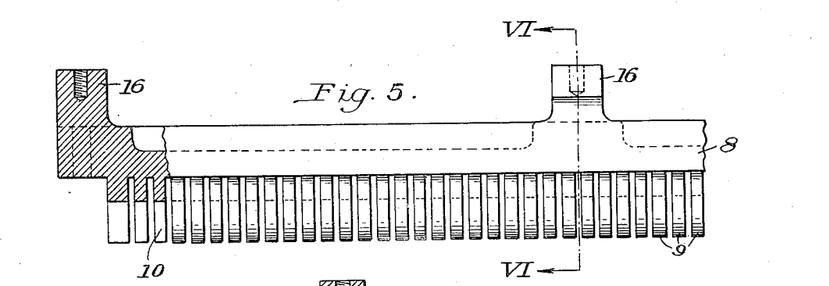
Figure 5 is a detailed view showing a front elevation of the transverse bar in which the several bell cranks for operating the hooks that engage the keys are supported.
Figure 6:
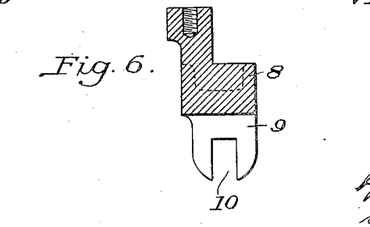
Figure 6 is a transverse section in the plane of line VI—VI of Figure 5.
Figure 7:
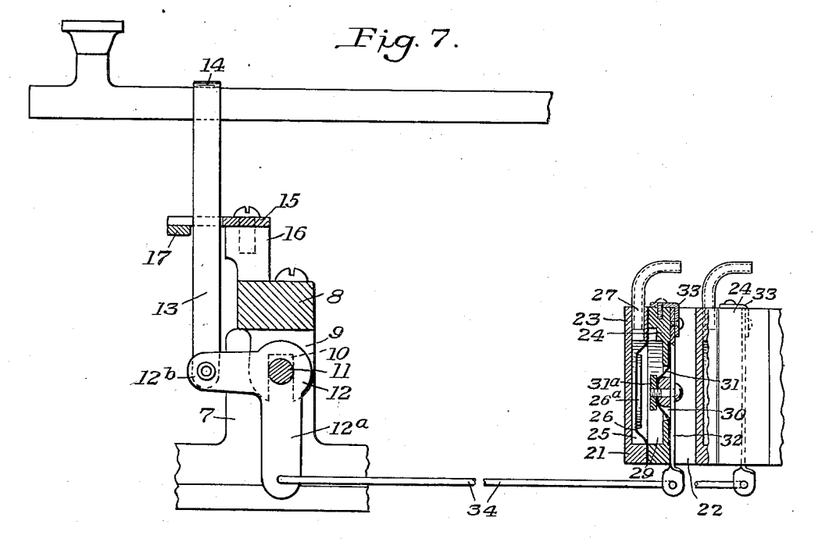
Figure 7 is a fragmentary view showing the key action for a single typewriter key bar.

In the drawings, 2 designates a bed or base member which may be in the form of a metal casting having a flat top and depending side flanges. It is provided with a forwardly extending platform designated generally as 3, this platform having spaced apart side bars 4 which are connected at the front of the machine by a cross member 5, the platform having an open central area 6. Secured to the two side rails 4 is a casting comprising four standards 7 as best shown in Figure 2 connected by a cross bar 8 as best shown in Figures 5, 6 and 7, the cross bar having a plurality of equidistantly spaced bifurcated lugs 9 projecting therefrom forming a comb-like structure. The lugs or ears 9 are bifurcated as indicated at 10 in order to receive a cross rod 11 that extends from one end of the comb to the other and which provides a pivotal support for a plurality of bell cranks 12 which are supported thereon, these bell cranks being located in the spaces between the lugs 9. Each bell crank has a depending arm 12a and a laterally extending arm 12b. Connected to the outer end of each crank arm 12b is an upwardly extending link 13 having a hook 14 at its upper end. The links 13 pass through slots in a slotted comb or guide strip 15 that is mounted on posts 16 on each of the side standards 7 and which extends across the casting in a plane above the cross bar 8. A strip 17 secured to the outer edge of the comb or slotted strip 15 serves to prevent the links from tilting forwardly out of the comb. The links 13, as shown in Figure 2, are all equidistantly spaced and they are all of the same height. These hooks are adapted to be engaged with the key bars of a typewriter as hereinafter more fully described.

Supported in the frame 3 so as to be positioned in the opening 6 is a pneumatic selector mechanism for operating the bell cranks. This selector mechanism is designated generally as 20 and is of the character which is disclosed and claimed in a copending application filed by myself and David R. Peterson, Serial No. 198,430 filed March 28, 1938, now issued as Patent No. 2,220,075, but is inverted from the position in which the selector is shown in said earlier application. The selector unit is comprised of a plurality of transversely extending sections 21 which sections are arranged in parallel relation to one another across the space 6 and which are separated from one another as indicated by the space 22 (see Figure 7). Each section 21 is formed of two strips 23 and 24 in face-to-face relation. The strip 23 has a plurality of chambers 25 formed therein spaced one from another across the length of the section. A flexible leather diaphragm 26 is secured over each of these chambers 25. Each section 25 is provided with a pipe nipple 27 adapted to be connected to a rubber hose or tube 28, the tube and nipple serving as a means to admit air to the chamber 25. The diaphragm 26 is provided with a rigid button 26a on the outer face of the diaphragm. The strip 24 is provided with a longitudinally extending channel 29 and it is also provided with a plurality of openings 30, there being one opening 30 in the member 24 opposite each one of the chambers 25. Each one of these openings is covered by a flexible diaphragm 31. A movable finger 32 is secured by a leather hinge 33 to the upper edge of the strip 24, there being one finger over each of the diaphragms 31. These fingers extend through the space 22 between the parallel sections. Each finger is connected with its respective diaphragm 31 and on the inner face of each diaphragm 31 is a button 31a for connection with the button 26a on the diaphragm 26. The channels 29 all communicate with a vacuum pump, as clearly explained in the said copending Carlson and Peterson application, and this suction line is not shown in the present application.

The arrangement is such that when an impulse of atmospheric air is admitted through the nipple 27 into the chamber 25, the diaphragm 26 will be forced to the right as viewed in Figure 7 by reason of there being a vacuum in the channel 29. In flexing or bowing outwardly to the right, the disk 26a on the diaphragm 26 will engage the disk 31a on the diaphragm 31 and also push this diaphragm toward the right. The diaphragm 26 being of considerably larger area than the diaphragm 31, it will have sufficient power to overcome the suction against the inner face of the diaphragm 31 to force the diaphragm 31 outwardly. This movement of the diaphragm 31 will be transmitted to the finger 32. When the source of atmospheric air to the nipple 27 is closed off and the air is allowed to bleed out of the chamber 26 through a bleed passage, not shown, and which may be provided in the tracker bar itself, the diaphragm 26 will be restored to the position shown in Figure 7 and atmospheric air acting against the diaphragm 31 will force the diaphragm back to the normal position, thus moving the finger 32 in the reverse direction.

Figure 4:
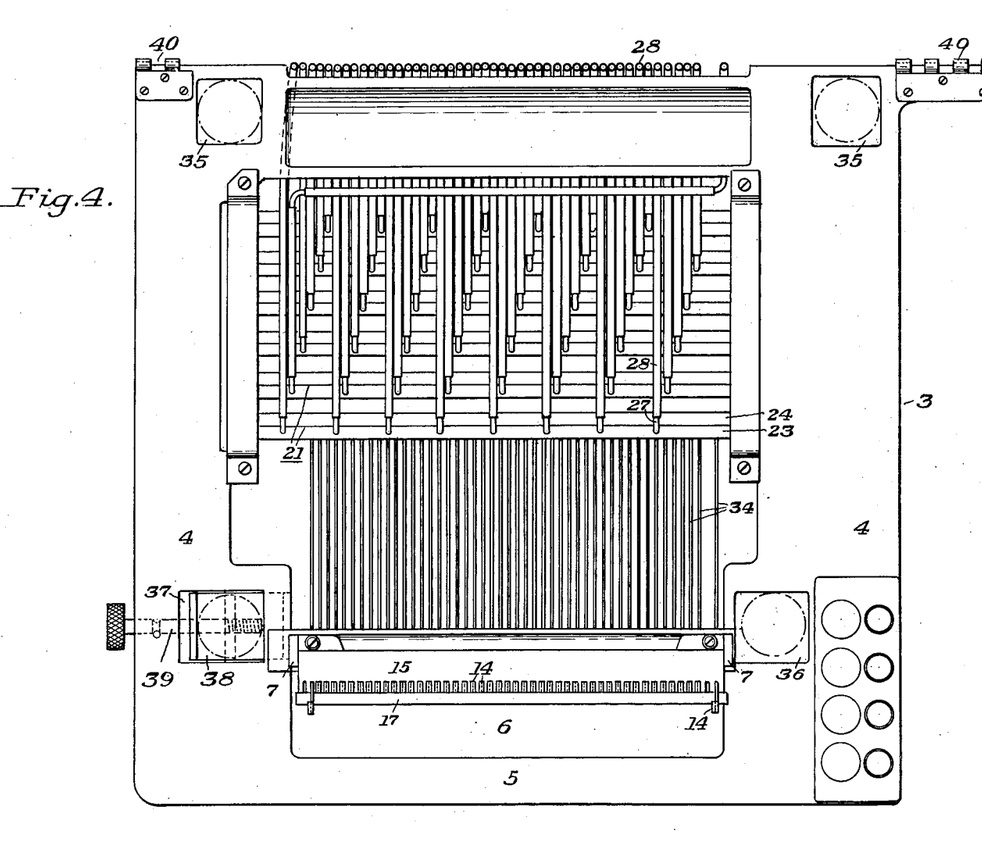
Figure 4 is a top plan view of a part of the apparatus with the typewriter removed.

The number of these diaphragm pouch units provided in the selector assembly corresponds to the number of keys on the typewriter to be operated and to the number of bell cranks 12. Each of the depending arms 12a is connected to one of the fingers 32 through a rod 34. The rods 34 are all arranged in the same plane and lie parallel. Because there cannot be sufficient pouch units in one section comprising the two members 23 and 24, the selector has several of these sections or banks arranged one behind the other and the pouch units in each one of the sections are laterally offset with respect to the pouch units of the sections immediately in front, as best shown in Figure 4 so that it is possible to provide a sufficient number of pouches all in the same plane and all within the width of a typewriter frame for operating all of the keys. The selector unit, together with the wires 34 and the mechanism including the bell cranks 12 are all of a width less than the width of a standard electrical typewriter, and the assembly is of a length such that it is all concealed under the base of a typewriter.

The rear end of the forward extension 3 of the platform or bed of the machine is provided as shown in Figure 4 with two recesses 35 adapted to receive the rear feet of a typewriter. These recesses are positioned crosswise a distance equal to the separation of the feet of the typewriter with which the mechanism is adapted to be used. Near the front of the platform in one of the side rails 4 is a similar recess 36 for the reception of one of the front feet of a typewriter but as shown in Figure 2, this recess is larger than the foot of the typewriter in order that the typewriter foot may have lateral movement in the recess. Opposite the recess 36 the platform is provided with a recess 37 in which is set a movable cup 38. A set screw 39 is provided for moving the cup 38 crosswise of the platform. The cup is of a size sufficient to receive the foot of a typewriter and it is spaced forwardly from the corresponding rear cup 35 the proper distance, the two recesses 35, the recess 36 and the cup 38 all being in a position to engage the four feet of a typewriter. The typewriter which is shown in Figure 2 is an electrically operated typewriter of the kind now commercially available and it has a casing A with rubber pads B forming the feet thereof. By reference to Figure 2, it will be seen that by turning the screw 39 the front end of the typewriter may be moved toward the left a slight distance. The typewriter is provided with a number of key bars C. These key bars, instead of being directly connected to the type bars for operating the type bars as they do in a manual typewriter, effect the operation of friction elements to bring them into engagement with a power roller and the power roller in turn serves to actuate the corresponding type bars; therefore the pressure required to operate any one of the key bars C is extremely slight. Typewriters of this character are available at the present time, and the drawings are intended to be only a conventional representation of such a typewriter. However, in Figure 2, D designates a motor-driven shaft which engages a worm E that operates a shaft F on which the power roller is mounted. The separation of the key bars C is equal to the separation of the hooks 14 at the top of the links 13. In Figure 2 the key bars 14 are shown engaged under the hooks 14 of the links 13 which is the position of the parts when the typewriter and operating mechanism are assembled for operation. As best shown in Figure 2, the cup 38 is moved as far to the right as it can be moved, but when the screw 39 is turned to move the typewriter to the left, the key bars C may be moved out of engagement with the hooks 14. When the typewriter has been so moved, it can be lifted off the pneumatic mechanism. To apply the typewriter to the pneumatic mechanism, the cup 38 is moved as far to the left as it can be moved and the typewriter is set into place over the pneumatic mechanism. The pneumatic system is then operated so that all of the diaphragms 31 are pulled back to the normal position causing the bell cranks 12 to be operated to lift the ends of the links 13 to their highest limit. The screw 39 is then twisted to shift the cup 38 to the right and move the key bars C under the hooks 14. Inasmuch as the interengaging hooks 14 and the key bars C comprise the only operating connections between the typewriter and the pneumatic mechanism, this operation of placing the typewriter in position or removing it can be accomplished by anyone without the need for any tools and without any special mechanical training.

The front part 3 of the bed of the machine may be hinged to the rear part 2 or it may be integral therewith. The drawings show the part 3 connected to the part 2 by hinges 40 (see Figures 1 and 4).

Figure 1:
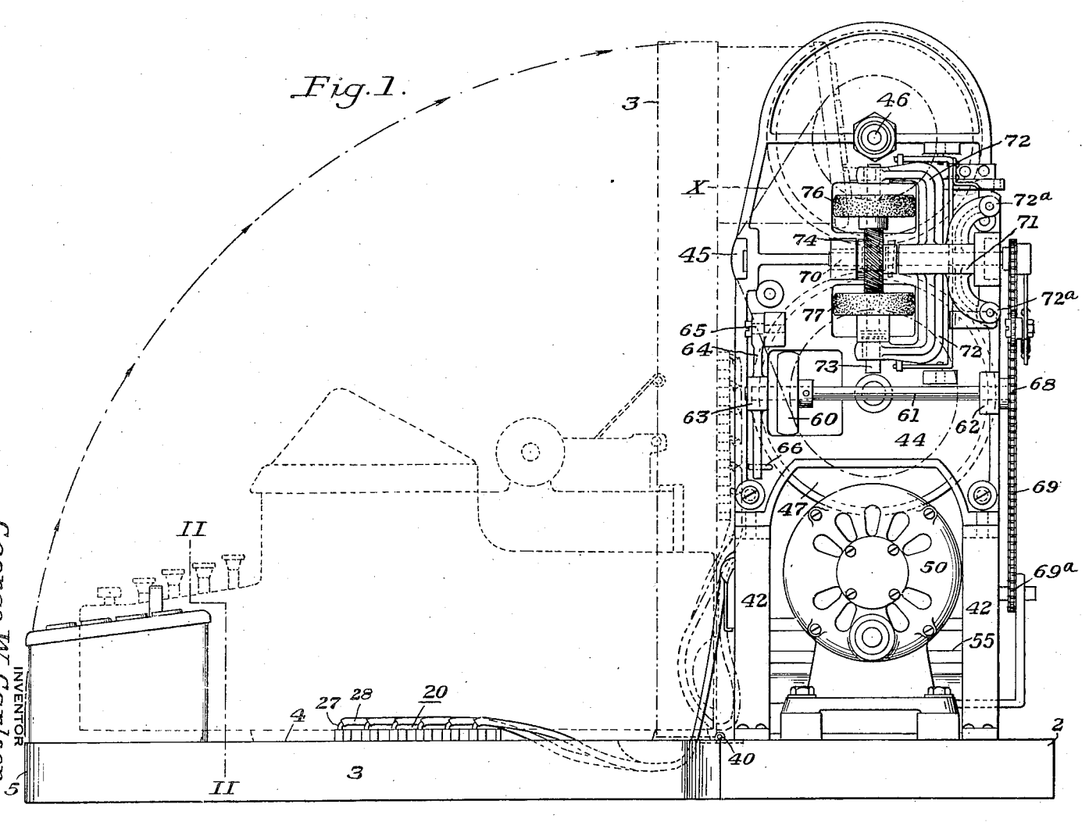
Figure 1 is a side elevation of a pneumatic actuating unit embodying my invention.

The rear part 2 of the bed of the machine is provided adjacent one side thereof with an upright bracket 41 and it is provided near the other side with two upright brackets 42. Set on top of the bracket 41 is a side plate 43 and set on the top of the brackets 42 is a second side plate 44. Extending between the two side plates 43 and 44 intermediate the top and bottom thereof is a tracker bar 45. The tracker bar 45 is provided with a number of openings and a tube 28 leads from each of the selector nipples 27 to one of the tracker bar openings. The construction of the tracker bar is similar to that used at the present time and the arrangement of openings and pneumatic tubes forms no part of the present invention except that if the forward part 3 of the platform is hinged to the part 2, the tubes are arranged as shown in Figure 1 to permit the part 3 to be swung upwardly to the dotted line position in which the part 3 lies in a vertical plane in front of the tracker bar. This folding of the platform is desired merely where it is necessary to conserve space for shipping or carrying the pneumatic mechanism.

Mounted on the plate 44 is a spindle 46 carrying an end plate 46a for engaging one end of a record roll and mounted on the plate 43 is a similar spindle 48 which carries a plate 49 for engagement with the other end of a record roll. The plate 49 is resiliently urged toward the plate 46a whereby a rolled paper record having a hollow core may be removably supported between the members 46a and 49. Extending across the space between the two plates 43 and 44 below the tracker bar is a take-up spool 47 onto which the record is wound as the record is run. The perforated paper record is indicated in Figure 1 by the dot and dash line marked X.

Figure 3:
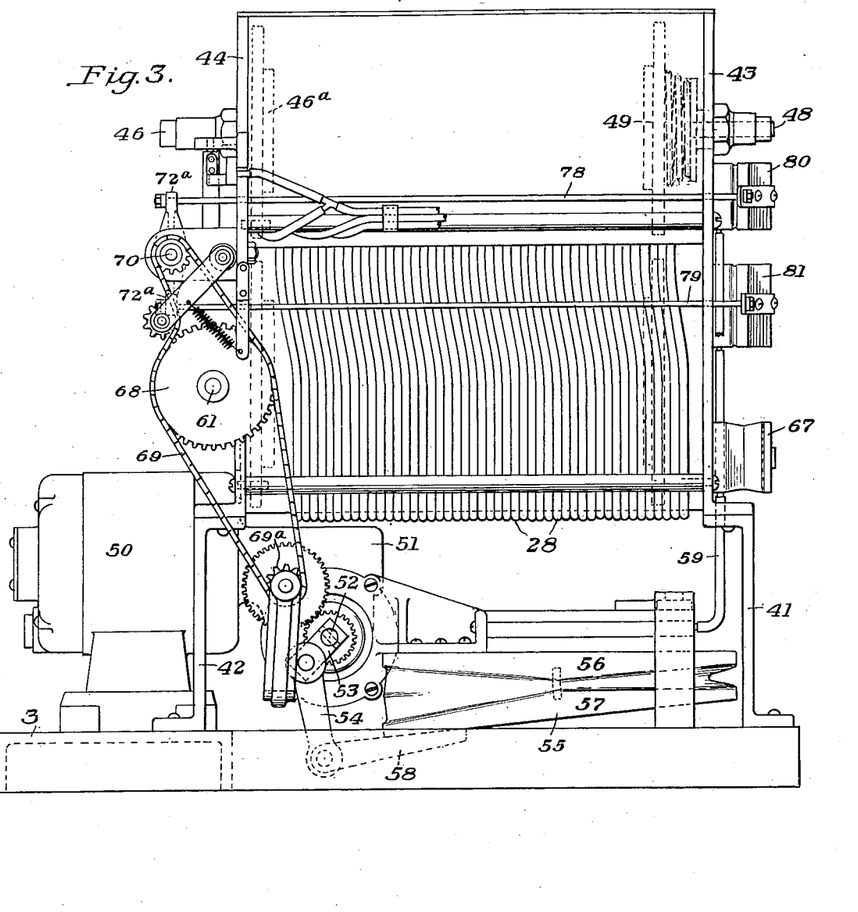
Figure 3 is a rear view of the mechanism shown in Figure 1.

Supported on the bed 2 of the machine between the upright brackets 42 is a motor 50 which has a housing 51 at one end thereof containing a reducing gear through which a shaft 52 is driven. The shaft 52 is provided at each end with a crank 53, each crank being provided with a connecting rod 54. The suction pump designated generally as 55 has two similar parts one of which is clearly shown in Figure 3 and which comprises a fixed upper plate 56 and a lower plate 57 which is tiltably supported at its center on the upper plate, and there is a leather covering around the edges of the plates to provide a double bellows arrangement so that as the member 57 is rocked up and down, first the bellows at one end of the member 57 and then the bellows at the upper end of the member will compress while the other is expanding. The second pump unit is the same as the one shown in Figure 3 and provides two additional bellows which are out of phase with the two shown in Figure 3, four small bellows being preferable to two large ones in order to provide a more uniform suction. The links 54 are connected to the extension 58 on the bottom plates 57 of the bellows for rocking the plates 57 up and down. Any other suitable bellows mechanism may be substituted, but a flat bellows as described having tilting plates 57 with a bellows chamber at each end thereof provides an extremely compact and simple type of bellows. In Figure 3, 59 designates the main suction line leading from the bellows.

Figures 10, 11, 12, 13, 14:
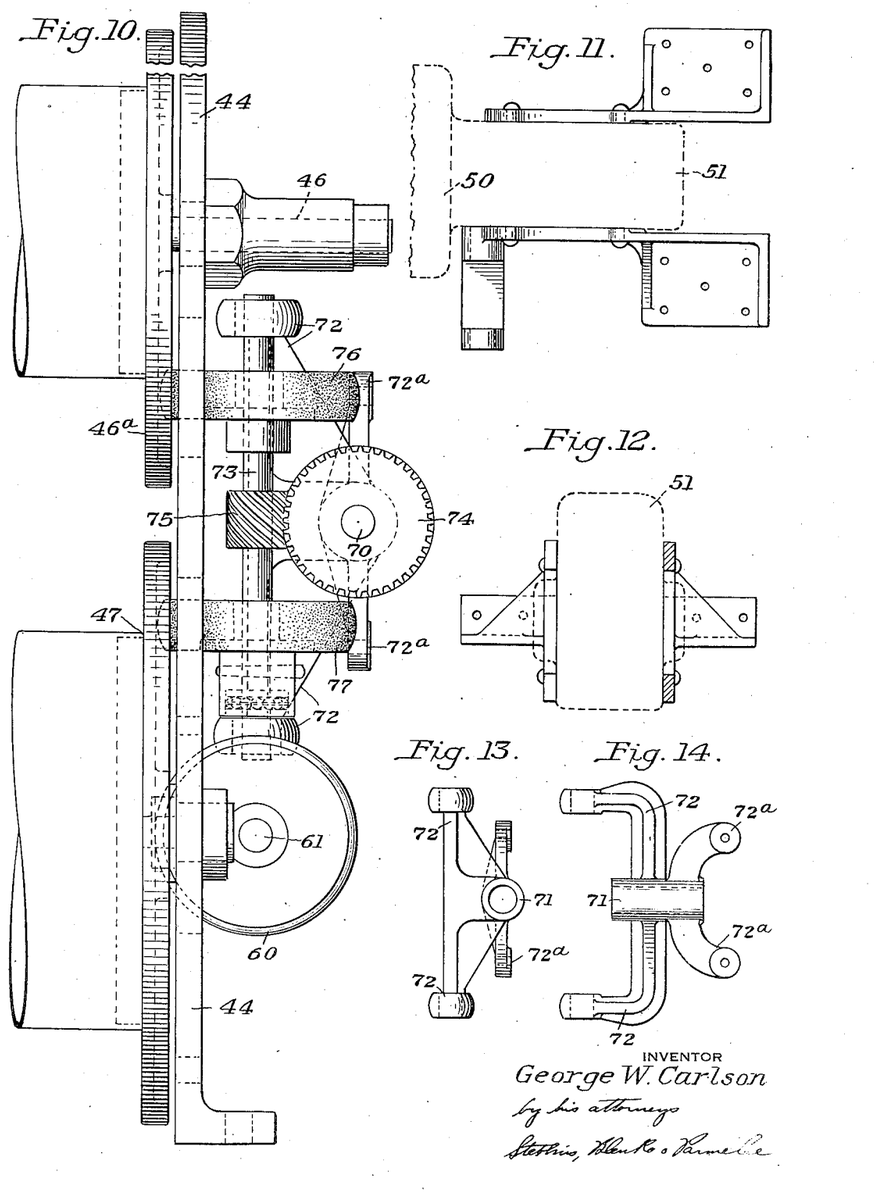
Figure 10 is a front elevation on a larger scale of a form of spool-driving mechanism for operating the take-up and re-wind spools for the perforated record.
Figure 11 is a detailed view showing a top plan view of a bracket constituting part of the support for the record-driving mechanism.
Figure 12 is another view of the parts shown in Figure 11, the view being a side elevation.
Figure 13 is a detailed view of a part of the driving mechanism shown in Figure 10.
Figure 14 is a side elevation of the parts shown in Figure 13.

For driving the record spool 47 forwardly, there is provided as shown in Figure 1 a friction roller 60 carried on a shaft 61 which is supported on the outside of the plate 44 and which engages the side face of the roller 47 through a window provided for this purpose in the side plate 44. The shaft 61 has one end loosely supported in a bearing 62 and has its other end in a bearing 63 which is mounted on a link 64, the top of which link is pivotally supported at 65 and the bottom of which is connected to a pull rod 66. The pull rod 66 is connected with a pneumatic 67. The pneumatic 67 by exerting a continuous pull on the rod 66 urges the link 64 to swing inwardly to hold the friction roller 60 against the end of the take-up spool 47. De-energizing the pneumatic 67 allows a spring, not shown, to pull the rod 66 in a direction to move the wheel 60 out of engagement with the end face of the roller. The shaft 61 is driven by means of a sprocket wheel 68 (see Figures 1 and 3). A chain 69 passes around the sprocket wheel for driving it, and the same chain passes around the sprocket wheel 69a which, as shown in Figure 3, is geared to the motor-driven shaft 52, the gearing being such that a speed reduction is made between the shaft 52 and the shaft 61 in order that the record will not be driven forwardly too fast. The sprocket chain 69 also drives a shaft 70 which is mounted on the outside of the plate 44. The shaft 70 supports a sleeve 71 having two arms 72 thereon which form a yoke for supporting a vertical shaft 73 see Figures 1 and 10). The shaft 70 is provided with a worm wheel 74 that drives a worm 75 on the vertical shaft 73. The shaft 73 has two friction rollers 76 and 77 thereon. One friction roller projects through a window in the plate 44 and engages the disk 46a of the record holder while the friction wheel 77 passes through a window in the plate 44 and may engage the end of the take-up spool. The shaft 70 provides a tilting support for the sleeve 71 and the yoke formed by the arm 72 so that by rocking or tilting the yoke about the shaft 70, the friction roll 76 may be caused to bear against the disk 47 for re-winding the record, or the friction wheel 77 may be brought into driving relation with the end of the take-up spool 46 to drive the record forward at high speed. This high speed forward drive is desired where the record roll may contain several separate records any one of which is to be selectively used and where the record is to be driven forward at high speed until the selected portion of the record is in position. The sleeve 71 is provided with two additional arms 72a. A pull rod 78 connects to the upper of the arms 72a and its opposite end is connected to a pneumatic 80. A pull rod 79 which is connected to the lower arm 72a connects to a similar pneumatic 81. By energizing either one or the other of the pneumatics 80—81 a high speed forward drive or the re-winding of the record is accomplished.

The tracker bar and record spool mechanism is thus located to the rear of the typewriter and in a convenient position with reference to the typewriter. The record roll driving mechanism is extremely simple and compact. The pneumatic pump mechanism is housed within the structure under the record winding and re-winding spools and the entire pneumatic mechanism is simple and compact.

The volume of air required to operate the selector pouches 26 is very small so that only a very small suction pump is required for the operation of the typewriter. A small diaphragm in the selector unit may be used because the selector has to furnish only enough power to operate its respective bell crank 12 to slightly depress a typewriter key. Since the actual work of moving the type bars of the typewriter is not accomplished by movement of the keys but by the power roller as previously explained, it is practical to use these selectors to operate the typewriter keys. Since the impulses of air coming through the tracker bar serve directly to operate the typewriter keys through the diaphragm pouches, the usual operating pneumatics are not required and valves for controlling the pneumatics are not required.

Figure 8:
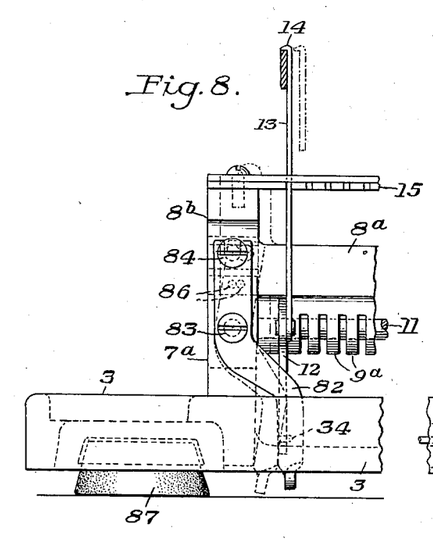
Figure 8 is a detailed view showing a front elevation of one end of a modified form of unit.
Figure 9:
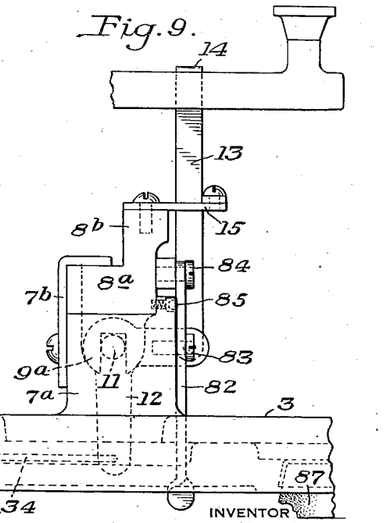
Figure 9 is a side elevation of Figure 8.

In the previous description, I have shown how the typewriter is shifted relatively to the hooks 14 to bring the typewriter key bars into and out of engagement with the hooks. Instead of shifting the typewriter, the same result may be accomplished by shifting the bell cranks with their cranks 13 and hooks 14 relatively to the typewriter. An arrangement for accomplishing this purpose is shown in Figures 8 and 9. In these figures, the base which is also designated 3 is provided with an upright 7a corresponding to the upright 7 but the cross bar, instead of being integral with the uprights as in Figure 7 is separate therefrom and slidably rests on top of the upright 7a. It is provided with depending lugs 8a for supporting the bell cranks. The cross bar 8a is slidably held in place by keepers 7b secured to the uprights 7a. The cross bar 8a is provided at each end with an upstanding lug 8b that supports a guide member 15 similar to the member 15 of Figure 7. Pivoted on the front of the upright 7a is a lever 82. The pivot for this lever is designated 83. It is provided with a bifurcated upper end that engages a screw 84 projecting from the cross bar 8a. The lower end of the lever 82 which is offset projects below the frame 3. By pushing the lever 82, the cross bar 8a with the parts which it carries may be shifted a limited distance back and forth as indicated by the dotted lines in Figure 8. The full line position in Figure 8 shows the location of the parts when the hooks are engaged over the key bars and the dotted line position shows the extent to which the parts may be moved to release the hooks 14 from the key bars. This modification of course requires some flexing of the wires 34 but this is not material.

In order to hold the lever 82 at one limit or the other of its movement there is a detent mechanism 85 comprising a spring-pressed ball mounted on the upright 7a and which is adapted to engage in either one of two recesses on the inner face of the lever 82, these two recesses being shown in dotted lines in Figure 8 at 86.

The platform itself may be provided with rubber pads 87 to keep it elevated above the table or other surface on which it is set. The operation of the lever 82 may be effected by reaching under the platform or by engaging the terminal of the lever with a suitable implement.

While I have illustrated and described certain preferred embodiments of my invention, it will be understood that the invention is not limited to the particular construction and arrangement of the parts specifically illustrated and described but may be otherwise embodied and that various changes and modifications are contemplated within the scope of the following claims.

I claim:

1. A record controlled operating mechanism for an electric typewriter having a plurality of parallel key bars, said mechanism comprising a supporting base having a plurality of bell cranks pivotally supported thereon, each bell crank having a vertical link pivotally attached to one arm thereof, each link having a key bar engaging hook at its upper end, the hooks of the several links being adapted to be engaged over the parallel key bars of the typewriter, each link being hooked over a different key bar, record controlled means on the base for selectively operating said bell cranks, and means on the base providing a shiftable support for the typewriters whereby the typewriter may be shifted laterally with reference to said hooks to move the key bars into or out of engagement with the hooks.

2. A record controlled pneumatic operating mechanism for an electric typewriter comprising a bed member on which the typewriter is adapted to set, a pneumatic selector mechanism supported in the bed member under the typewriter, said pneumatic selector mechanism having a plurality of pneumatic pouch units arranged in banks in a common plane each pouch unit having a movable finger which it operates, a bank of horizontally extending connectors, each being connected at one end to one of the fingers, a row of bell crank levers mounted on the bed member, each bell crank in the row having a depending arm and a second arm angularly disposed to the first, the other end of each connector being attached to the depending arm of one of the bell cranks, and a link extending upwardly from the second arm of each bell crank, said link having a terminal portion which engages a key bar of the typewriter.

3. A record controlled pneumatic operating mechanism for an electric typewriter comprising a bed member on which the typewriter is adapted to set, a pneumatic selector mechanism supported in the bed member under the typewriter, said pneumatic selector mechanism having a plurality of pneumatic pouch units arranged in banks in a common plane each pouch unit having a movable finger which it operates, a bank of horizontally extending connectors, each being connected at one end to one of the fingers, a row of bell crank levers mounted on the bed member, each having a depending arm and a second arm extending at an angle to the first, the other end of each connector being attached to the depending arm of a bell crank, a link extending upwardly from the second arm of each bell crank, each link having a terminal portion which engages a key bar of the typewriter, said pneumatic selector mechanism, connectors and bell cranks all being of a dimension such as to be covered by the typewriter, and a record winding mechanism and tracker bar and vacuum pump on the base at the rear of the typewriter.

4. A pneumatic operating mechanism for an electric typewriter having a plurality of spaced key bars, said mechanism comprising a plurality of vertically movable links each having a hook-like terminal at its upper end, said links being so spaced that each hook-like terminal thereof engages a key bar of the typewriter, the hook-like terminals of the links being engaged over the upper edges of their respective key bars, there being sufficient clearance between the hook-like terminals to enable the key bars to pass between said terminals when the typewriter is shifted laterally with respect thereto, and a pneumatic selector mechanism for operating the links.

5. A pneumatic operating mechanism for an electric typewriter having a plurality of spaced key bars, said mechanism comprising a plurality of vertically movable links each having a hook-like terminal at its upper end, the links being so spaced that each hook-like terminal thereof engages a key bar of the typewriter, and a pneumatic selector mechanism for operating the links, said selector mechanism comprising a unit having a plurality of separately controlled pneumatic pouch elements each element having a finger which it operates, a connecting rod attached to each finger, and a bell crank attached to each link, each bell crank also being attached to one of the connecting rods.

6. A pneumatic operating mechanism for an electric typewriter having a plurality of spaced key bars, said mechanism comprising a plurality of vertically movable links each of which has a hook-like terminal at its upper end, said links being so spaced that each hook-like terminal thereof engages a key bar of the typewriter, a pneumatic selector mechanism for operating the links, and means for effecting relative lateral movement between the typewriter and the links for bringing the hook-like terminals and the key bars into or moving them out of engagement.

7. A record controlled pneumatic operating mechanism for an electric typewriter comprising a bed member having a rear portion and a platform portion extending forwardly therefrom, said platform portion being adapted to provide a support for a typewriter, said rear portion having a driving motor thereon and having a pump thereon, there being a tracker bar with record spools and a drive for winding and re-winding a record over the tracker bar, said forward platform portion having a pneumatic selector unit thereon with a plurality of individual pneumatic pouch elements therein, each pouch element having a finger, a connecting rod operable by said finger, the several connecting rods extending forwardly in a plane along the platform, a plurality of vertically movable hook members adapted to engage the key bars of a typewriter, and means for transmitting motion from the several connecting rods to the several hook members.

8. A record controlled pneumatic operating mechanism for an electric typewriter comprising a bed member having a rear portion and a platform portion extending forwardly therefrom, said platform portion being adapted to provide a support for a typewriter, said rear portion having a driving motor thereon and having a pump thereon, there being a tracker bar with record spools and a drive for winding and re-winding a record over the tracker bar, said forward platform portion having a pneumatic selector unit thereon with a plurality of individual pneumatic pouch elements therein, each pouch element having a finger, a plurality of vertically movable hook members each adapted to engage a key bar of a typewriter, and means for transmitting motion from each of said pouch fingers to a corresponding hook member, the platform portion of the bed being hinged to the rear portion so that it may be swung to a position substantially at right angles to said rear portion and in front of the tracker bar when the typewriter is removed therefrom, there being rubber tubes extending from the tracker bar to the individual pneumatic pouch elements positioned to permit such movement of the platform portion.

9. A record controlled pneumatic operating mechanism for an electric typewriter comprising a pneumatic selector unit of the type having a flexible pneumatic pouch for each key of the typewriter which pouch is normally biased in one direction by suction applied to one side thereof, means including a record controlled tracker bar for selectively admitting air to the other side of each pouch for controllably flexing the pouch from a normal position, a finger associated with each pouch and operated by the flexing thereof, and a driving connection between each finger and a typewriter key bar.

10. A record controlled pneumatic operating mechanism for an electric typewriter comprising a pneumatic selector unit of the type having a flexible pneumatic pouch for each key of the typewriter which pouch is normally biased in one direction by suction applied to one side thereof, means including a record controlled tracker bar for selectively admitting air to the other side of each pouch for controllably flexing the pouch from a normal position, a finger associated with each pouch and operated by the flexing thereof, a driving connection between each finger and a typewriter key bar, and a second pouch for returning the first pouch to a normal position after it has been flexed from the normal position.

11. A record controlled pneumatic operating mechanism for an electric typewriter comprising a pneumatic selector unit of the type having a flexible pneumatic pouch for each key of the typewriter which pouch is normally biased in one direction by suction applied to one side thereof, means including a record controlled tracker bar for selectively admitting air to the other side of each pouch for flexing the pouch from a normal position, a finger associated with each pouch and operated by the flexing thereof, a driving connection between each finger and a typewriter key bar, and a second pouch for returning the first pouch to a normal position after it has been flexed from the normal position, said driving connection including a vertically movable link member having a hook at its upper end adapted to engage over the key bar of the typewriter, a bell crank for moving the link member and an operating connection between each bell crank and a selector finger.

12. The combination with a power operated typewriter of the type wherein the typewriter keys merely serve to establish a driving connection between the corresponding type bar and a power mechanism, of an actuating device having a plurality of pneumatic pouches each utilizing a flexible diaphragm, the number of pouches corresponding to the number of keys to be operated, means for transmitting motion from the diaphragm of each pouch to operate a predetermined typewriter key, and a record controlled pneumatic system of which the pouches comprise a part for selectively operating the typewriter keys.

GEORGE W. CARLSON.